(12) United States Patent
So

(10) Patent No.: US 7,026,795 B2
(45) Date of Patent: Apr. 11, 2006

(54) METHOD FOR PULSE MODULATION CONTROL OF SWITCHING REGULATORS

(75) Inventor: John Sung K. So, Freemont, CA (US)

(73) Assignee: Advanced Analogic Technologies, Inc., Sunnyvale, CA (US)

( * ) Notice: Subject to any disclaimer, the term of this patent is extended or adjusted under 35 U.S.C. 154(b) by 246 days.

(21) Appl. No.: 10/616,382

(22) Filed: Jul. 9, 2003

(65) Prior Publication Data

US 2005/0007796 A1 Jan. 13, 2005

(51) Int. Cl.
*G05F 1/656* (2006.01)
*G05F 1/613* (2006.01)

(52) U.S. Cl. .......................... 323/222; 323/224; 363/41
(58) Field of Classification Search ................ 323/222, 323/224, 223; 363/41
See application file for complete search history.

(56) References Cited

U.S. PATENT DOCUMENTS 6,362,608 B1 * 3/2002 Ashburn et al. ............ 323/272
6,366,062 B1 * 4/2002 Baretich et al. ............ 323/223
6,373,728 B1 * 4/2002 Aarestrup .................... 363/37
6,396,250 B1 * 5/2002 Bridge ........................ 323/283
6,597,157 B1 * 7/2003 Boeckmann et al. ....... 323/242
6,788,033 B1 * 9/2004 Vinciarelli .................. 323/225

* cited by examiner

*Primary Examiner*—Bao Q. Vu

(57) ABSTRACT

A method for pulse modulation control of switching regulators includes positioning a series of parallel FET-type switches (high-side switches) between the input side of an inductor and the voltage supply. A second parallel series of FET-type switches (low-side switches) are used to connect the input side of the inductor to ground. A control module enables one or more of the high-side switches at the start of each switching cycle. The enabled high side switches remain enabled until the output of the buck-type switching regulator is within regulation or a current limit through the high-side switches has been exceeded. The control module then disables all high-side switches and enables an equivalent number of low-side switches. The low-side switches remain enabled until the output has fallen below regulation or current has ceased to flow from the inductor to the load of the regulator.

12 Claims, 5 Drawing Sheets

US 7,026,795 B2

METHOD FOR PULSE MODULATION CONTROL OF SWITCHING REGULATORS

RELATED APPLICATIONS

This application claims the benefit of a U.S. Provisional Patent Application Ser. No. 60/368,474 entitled "Pulse Modulation Control of Switching Regulators" filed Mar. 28, 2002. The disclosure of that provisional application is incorporated in this document by reference.

TECHNICAL FIELD OF THE INVENTION

The present invention relates generally to switching power supplies. More particularly, the present invention relates to methods for producing low-noise, high efficiency switching regulators that provide fast response to transient load variations.

BACKGROUND OF THE INVENTION

Extending battery life is one of the most important tasks faced by designers of portable electronic systems. This is particularly true for consumer electronics, such as cellular phones, digital cameras, portable computers and other handheld equipment. Designers of these products are faced with a continual need to reduce package size (and battery size) while increasing battery life to match or exceed competitive products.

Voltage regulators play an important role in extending battery life. In portable electronic systems, these regulators are used to increase, decrease and invert voltages to perform a wide range of tasks. In portable electronics, the efficiency of these devices is an important, and in some cases crucial consideration.

Switching regulators are generally considered to be among the most efficient and versatile available. For typical applications, the efficiency of switching regulators exceeds ninety percent. As shown in FIG. 1, they may be used to convert voltage upward (boost or step-up configuration). Alternately, and as shown in FIG. 2, switching regulators may be used to convert voltage downward (buck or step-down configuration). Switching regulators may even be used as shown in FIG. 3 to invert voltage (buck-boost or inverting configuration).

Switching regulators can generally be classified as either pulse-width-modulation (PWM) or pulse-frequency-modulation (PFM) types. PWM regulators produce a pulse train having a fixed frequency and a variable pulse width. PFM regulators, on the other hand, use a fixed pulse width and a variable pulse frequency. Over time, various methods have been used to enhance the basic PWM and PFM methods. For many PWM applications, this has resulted in a switch from voltage mode control to current mode control. Current mode control has a number of inherent advantages including faster response to changing loads and ease of combining the output of multiple regulators. PFM regulator topologies have been refined to support pulse skipping, hysteretic and burst mode control.

Unfortunately, neither PWM nor PFM types are without disadvantages. As shown in FIG. 4A, conventional switching regulators (a voltage mode PWM controller in this case) include a feedback loop with an analog error amplifier and comparator as core elements. As shown in FIG. 4A, the output of the PWM controller (labeled $V_{fb}$ for feedback voltage) is sent to the error amplifier. The output of the error amplifier (labeled $V_{err}$ for error voltage) is the difference between a reference voltage (labeled $V_{ref}$) and the feedback voltage $V_{fb}$. $V_{err}$ sets the threshold of a comparator whose other input is connected to a ramp voltage ($V_{ramp}$). The output of the comparator drives a switch. Greater error voltages increase the comparator threshold on the comparator and increase the amount of time the switch is enabled. As the switch is held on longer, the peak current in the inductor is allowed to climb higher, storing more energy to serve the load and maintain regulation. The relationship is shown graphically in FIG. 4b. In general, this approach is characterized by low efficiency at light load, slow dynamic response with transients, and loop instability resulting from variations of component values, switching noise injection or insufficient compensational margins. In general, PFM can be used to increase efficiency for light load conditions. Unfortunately, PFM designs are prone to producing electromagnetic noise over a broad spectrum. As a result, there are many applications where PFM cannot be used.

For these reasons and others, there is a need for switching regulators that have rapid dynamic response to transients, and do not suffer from loop instability resulting from variations of component values, switching noise injection or insufficient compensational margins. This need is particularly important for applications that cannot tolerate the noise associated with PFM based regulators.

SUMMARY OF THE INVENTION

The present invention includes a method for pulse modulation control of switching regulators. A buck-type switching regulator implemented using this method uses a filter capacitor and an inductor. These components are used as they would be in a typical buck-type topology with the filter capacitor in parallel with the regulator load and the inductor positioned in series between the capacitor and the voltage supply. A first series of parallel FET-type switches (high-side switches) are positioned between the input side of the inductor and the voltage supply. A second parallel series of FET-type switches (low-side switches) are used to connect the input side of the inductor to ground. The low-side switches are somewhat analogous to the diode used in typical buck-type topologies.

A control module enables one or more of the high-side switches synchronously with a system clock at the start of each switching cycle. The number of high-side switched enabled is chosen to match the instantaneous load of the buck-type switching regulator. The enabled high-side switches remain enabled until the output of the buck-type switching regulator is within regulation or a predetermined current limit through the high-side switches has been exceeded. The control module then disables all high-side switches and enables (in a break-before-make fashion) an equivalent number of low-side switches. The low-side switches remain enabled until the output of the buck-type switching regulator has fallen below regulation or current has ceased to flow from the inductor to the load of the regulator.

The entire switching cycle then repeats with the number of high-side and low-side switches adjusted up, down or held constant depending on the load of the regulator. With appropriate modifications, the pulse modulation control method can used to implement the full range of switching regulator topologies including boost, buck, and boost-buck types.

DETAILED DESCRIPTION OF THE PREFERRED EMBODIMENTS

Figure 1:
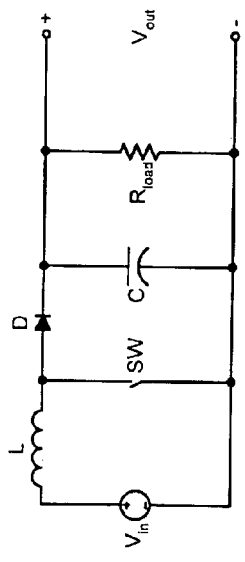
FIG. 1 is a block diagram of a prior art boost type switching regulator.
Figure 2:
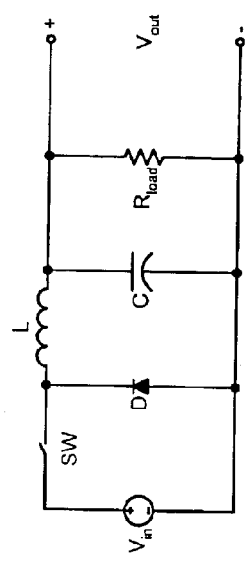
FIG. 2 is a block diagram of a prior art buck type switching regulator.
Figure 3:
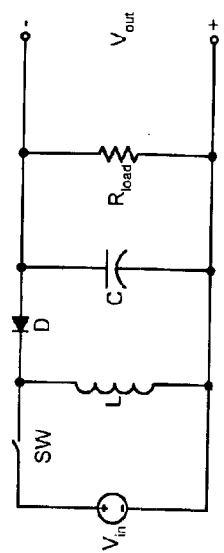
FIG. 3 is a block diagram of a prior art buck-boost type switching regulator.
Figure 4A:
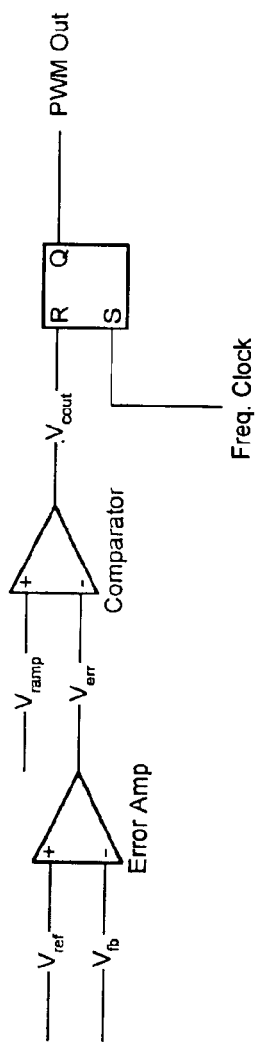
FIG. 4A is a block diagram of a feedback loop with an analog error amplifier used to control a prior art buck-boost type switching regulator.
Figure 4B:
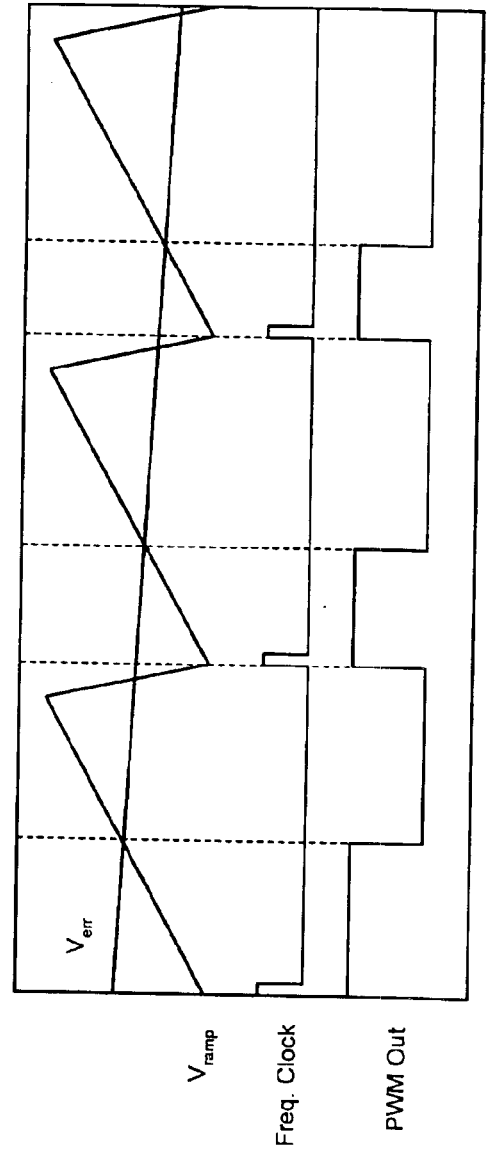
FIG. 4B is a timing diagram showing the operational performance of the feedback loop of FIG. 4A.
Figure 5:
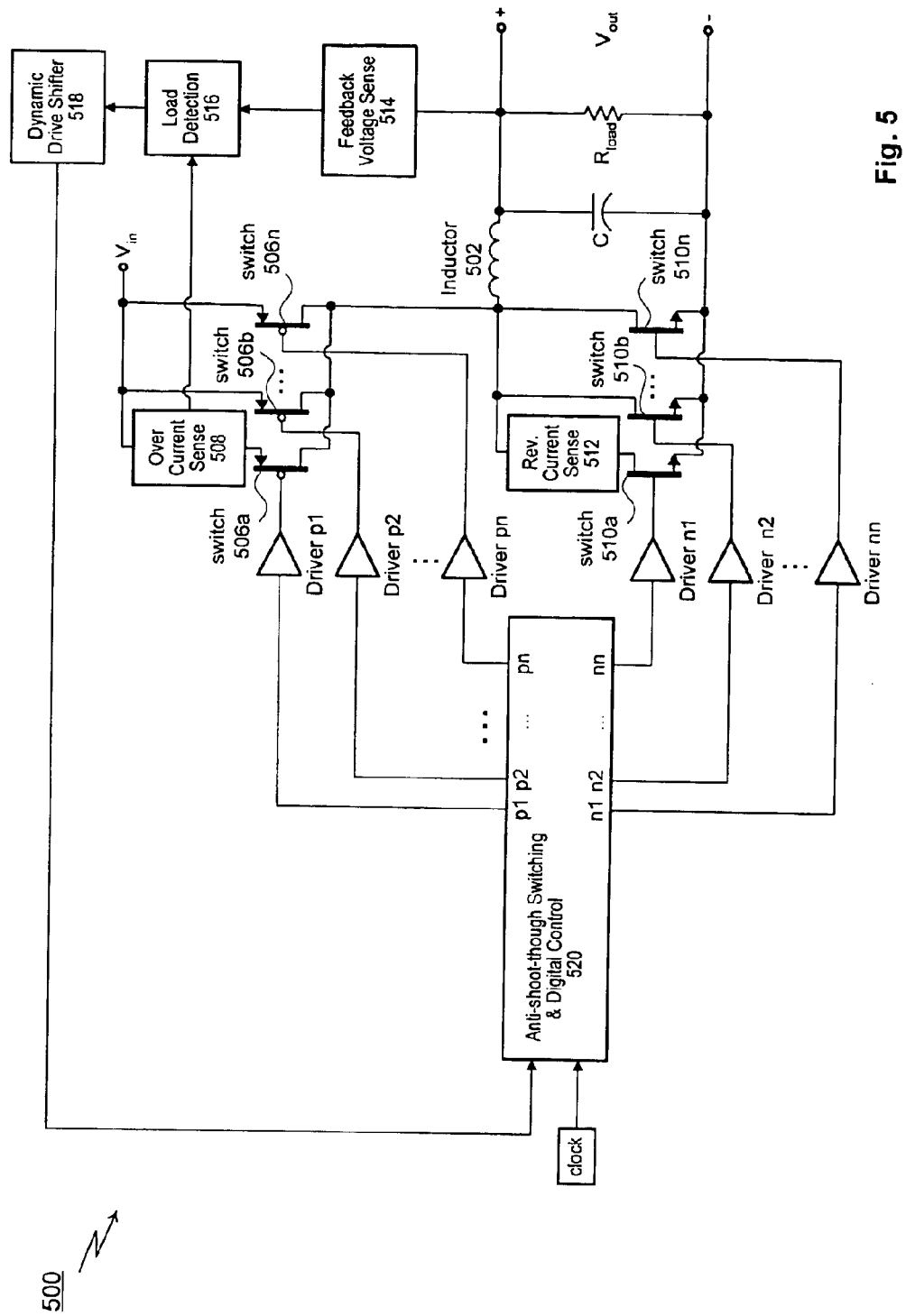
FIG. 5 is a block diagram of a buck type switching regulator implemented using a pulse modulation control method provided by the present invention.

The present invention includes a method for pulse modulation control of switching regulators. The pulse modulation control method can used to implement the full range of switching regulator topologies including boost, buck, and boost-buck types. FIG. 5 shows an implementation of a buck-type switching regulator 500 that uses the pulse modulation control method. This implementation includes the familiar inductor (labeled L) and capacitor (labeled C) originally shown in FIG. 2 and operates to convert an input voltage $V_{in}$ to an output voltage $V_{out}$.

Buck-type switching regulator 500 includes a series of high-side switches labeled 506a through 506n. Each high-side switch 506 is typically implemented as an FET type device, but other appropriate technologies may also be used. High-side switches 506 are functionally analogous to the switch included in the buck-type converter of FIG. 2 and form a link between the input voltage $V_{in}$ and inductor 502. Selecting the number of high-side switches 506 that are on, controls the rate of current flowing from $V_{in}$ to inductor 502.

The rate of current flow between $V_{in}$ to inductor 502 is monitored by an over current sense circuit 508. Typically, this is accomplished by monitoring the current following through one of the high-side switches 506. This requires that the monitored high-side switch 506 be used as the primary high-side switch 506 (i.e., any combination of closed high-side switches 506 must include the monitored high-side switch 506). Over current sense circuit 508 compares the current through the monitored high-side switch 506 to a predetermined limit using a high-speed comparator. When asserted, the output of the comparator indicates that the predetermined current limit has been reached.

Buck-type switching regulator 500 also includes a series of low-side switches labeled 510a through 510n. As with high-side switches 506, each low-side switch 510 is typically implemented as an FET-type device, but other appropriate technologies may also be used. Low-side switches 510 are functionally analogous to the diode in the buck-type converter of FIG. 2 and form a link between inductor 502 and the ground output of buck-type switching regulator 500. Selecting the number of low-side switches 510 that are on, controls the rate of current flowing from the ground output to inductor 502.

The rate of current flow between $V_{out}$ to inductor 502 is monitored by a reverse current sense circuit 512. Typically, this is accomplished by monitoring the current following through one of the low-side switches 510. This requires that the monitored low-side switch 510 be used as the primary low-side switch 510 (i.e., any combination of closed low-side switches 510 must include the monitored low-side switch 510). Reverse current sense circuit 512 examines the direction of current flowing through the monitored low-side switch 510. Current flowing from $V_{out}$ to inductor 502 is detected and used to turn low-side switches 510 off.

The level of $V_{out}$ is monitored by a feedback voltage sense circuit 514. Typically, this is performed by comparing $V_{out}$ to a reference voltage using a comparator or similar device. The result of this comparison is forwarded to a load detection circuit 516. Load detection circuit 516 also receives the output of over current sense circuit 508. The frequency with which $V_{out}$ is found to be within regulation is compared to the frequency with which the predetermined current limit is exceeded. In insufficient drive situations (i.e., in situations where an inadequate number of high-side switches 506 are being used) the frequency of over current events dominates the frequency of in-regulation events. In lightly loaded situations the frequency of in-regulation events dominates the frequency of over current events.

The output of load detection circuit 516 is passed to a dynamic driver shifter circuit 518. Dynamic driver shifter circuit 518 uses this input to construct an output that indicates if the number of active high-side switches 506 and low-side switches 510 should be increased, decreased or maintained as is.

The output of dynamic driver shifter circuit 518 is passed to an anti-shoot-through switching and digital control module 520. Control module 520 uses this input, and a system clock signal to control the state of high-side switches 506 and low-side switches 510. Control module 520 enables high-side switches 506 synchronously with the system clock. The number of high-side switches 506 is determined by the output of dynamic driver shifter circuit 518. The enabled high-side switches 506 remain enabled until: 1) over current sense circuit 508 detects that the predetermined current limit has been exceeded, or 2) feedback voltage sense circuit 514 detects that $V_{out}$ has attained the reference voltage.

At that time, control module 520 disables all high-side switches 506. Control module 520 then enables an equivalent number of low-side switches 510 (i.e., the number of enable low-side switches is equal to the number of previously enabled high-side switches 506). Low-side switches 510 are enabled after all high-side switches 506 have been disabled in a break-before-make fashion. This avoids shoot through where $V_{in}$ is connected directly to ground. The enabled low-side switches 510 remain enabled until: 1) reverse current sense circuit 512 detects current flowing from $V_{out}$ to inductor 502, or 2) feedback voltage sense circuit 514 detects that $V_{out}$ has fallen below the reference voltage. At that time, control module 520 disables all low-side switches 510 (once again in a break-before-make fashion) in preparation for enablement of high-side switches 506 at the start of the next clock.

Figure 6:
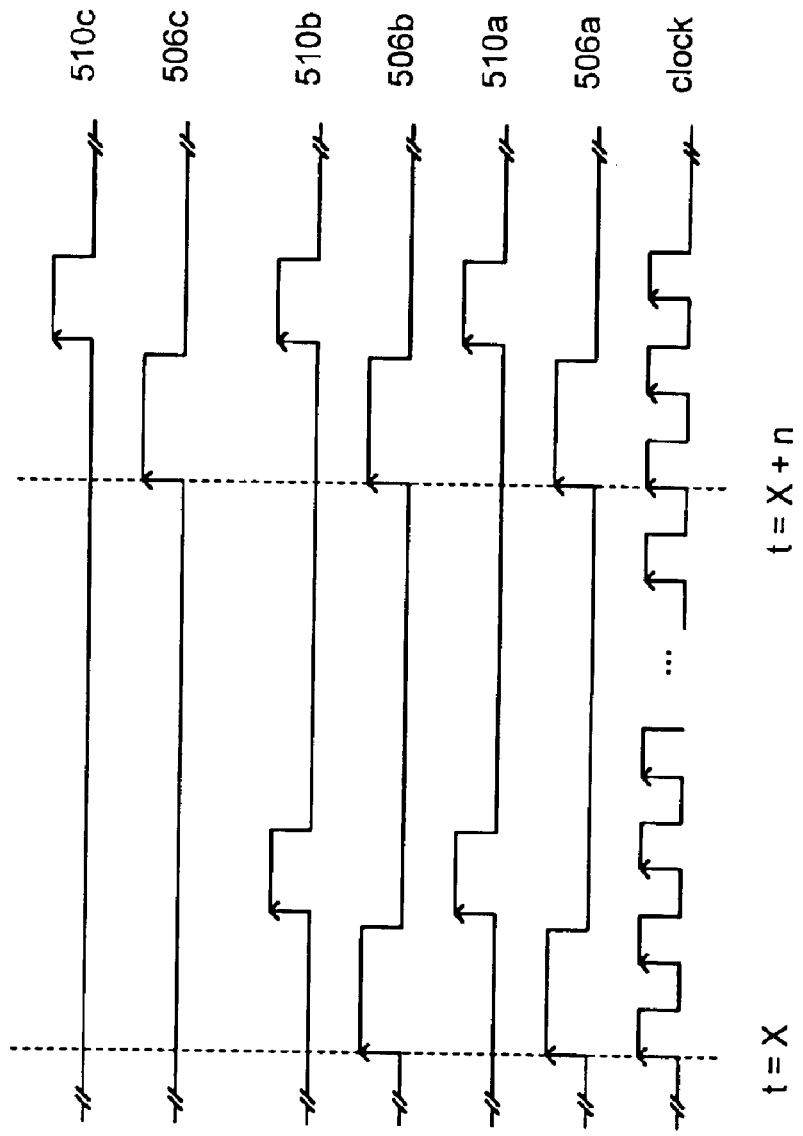
FIG. 6 is a timing diagram for the buck type switching regulator of FIG. 5.

FIG. 6 shows operation of buck-type switching regulator 500 over several cycles of the system clock. As shown in that figure, control module 520 enables high-side switches 506a and 506b at the start of a clock cycle labeled X. This is in response to an indication from dynamic driver shifter circuit 518 that a total of two high-side switches 506 are required to compensate for the instantaneous load of the buck-type switching regulator 500. The third high-side switch 506c (or 506n in FIG. 5) remains disabled.

Control module 520 subsequently disables high-side switches 506a and 506b after the predetermined current limit has been exceeded, or $V_{out}$ has attained the reference voltage. Once high-side switches 506a and 506b have been disabled, control module 520 enables low-side switches 510a and 510b. These stay enabled until current starts flowing from $V_{out}$ to inductor 502 or $V_{out}$ has fallen below the reference voltage. The entire cycle is then repeated starting at a clock cycle labeled X+n. In this case, a total of three high-side switches 506 are enabled followed by three low-side switches 510. This indicates that the load of buck-type switching regulator 500 has increased over the previous switching cycle.

Figure 7:
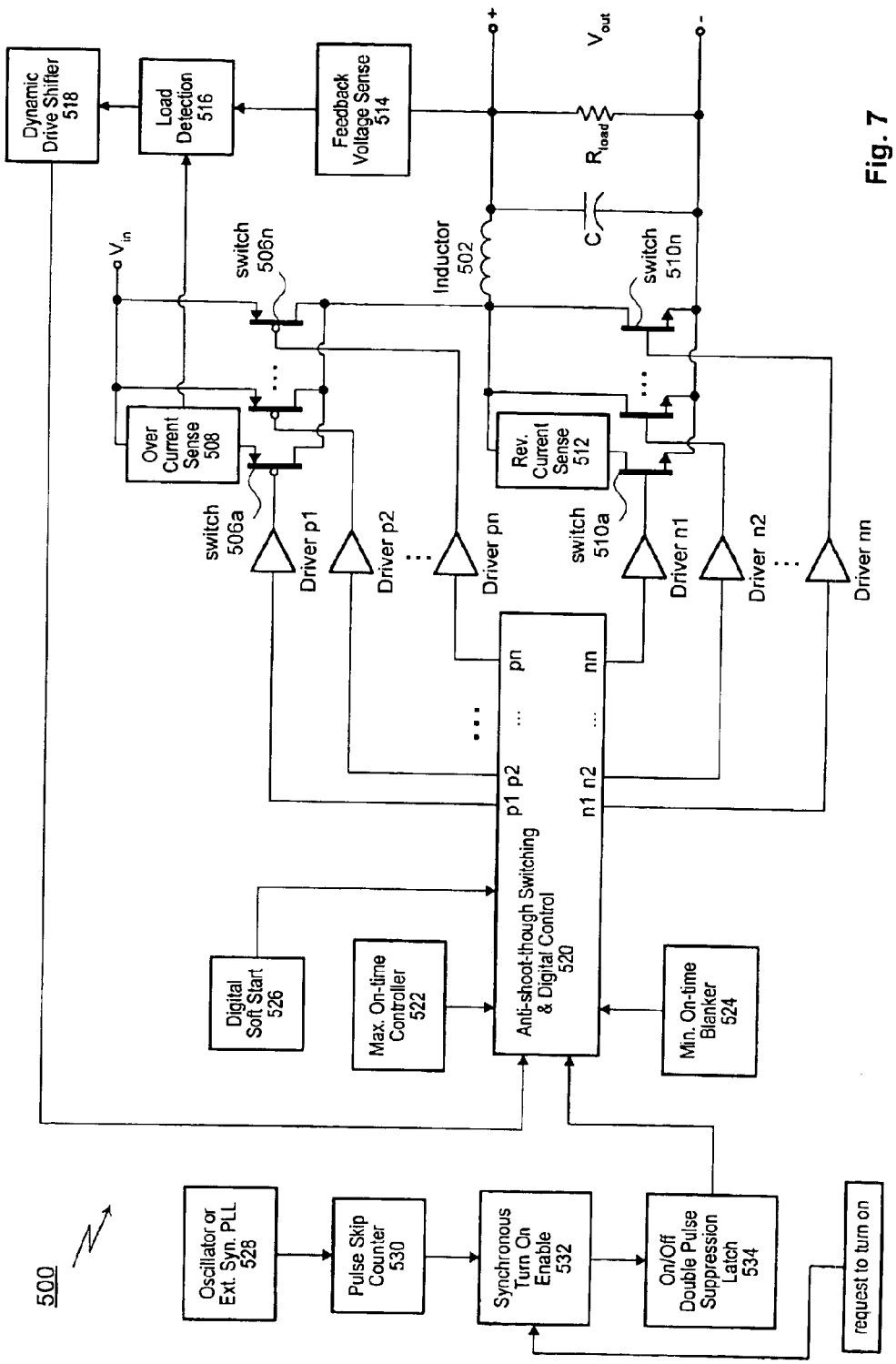
FIG. 7 is a block diagram showing additional enhancements for the buck type switching regulator of FIG. 5.

FIG. 7 shows several enhancements that may be made to improve the performance of buck-type switching regulator 500. These include a maximum on-time controller 522 and a minimum on-time blanker 524. These two circuits place upper and lower limits (respectively) on the amount of time that high-side switches 504 are enabled. This ensures that the switching cycle is not prolonged indefinitely and prevents transient ringing from causing high-side switches 504 to switch on and off. Maximum on-time controller 522 also places a lower bound on the switching frequency of buck-type switching regulator 500. Preferably, this lower bound is higher than the audio band, ensuring silent operation of buck-type switching regulator 500.

The enhancements of FIG. 7 also include a digital soft start 526 that incrementally increases the number of enabled high-side switches 506 active. Typically, this increase is performed at a predetermined rate derived by dividing the frequency of the system clock. The soft start function is important during startup to reduce inrush current drawn from the input.

FIG. 7 also shows a series of enhancements all related to the system clock input. These include: an oscillator or external synchronous phase-locked loop circuit 528, a pulse skip counter circuit 530, a synchronous turn on enable circuit 532 and an on/off double pulse suppression latch 534. Oscillator or external synchronous phase-locked loop circuit 528 is a high frequency (e.g., MHz range) low jitter oscillator, phase-locked loop or equivalent circuit that is capable of either generating a stable clock signal or synchronizing to a reference-timing signal. The main function of this circuit is to define the switch-on time-edge for the system and also provides the clock timing for other functional blocks.

Pulse skip counter circuit 530 is used to block out the switching noise of pre-defined frequency bands. This block delays the switch-on time-edge event by skipping the critical frequency range.

Synchronous turn on enable circuit 532 gates a request-to-turn-on signal with the system clock. This synchronizes the turn-on time-edge of buck-type switching regulator 500 with the system clock.

On/off double pulse suppression latch 534 latches the switching of high-side switches 506 and low-side switches 510. This ensures that buck-type switching regulator 500 stays on until deactivated by an off signal and prevents the ringing that might occur if buck-type switching regulator 500 turned off rapidly after being activated.

Control module 520 provides a flexible mechanism for controlling switching regulator behavior. For example, it is possible to configure control module 520 to avoid undesirable switching frequency bands. This can avoid noise that to which a particular device is sensitive (e.g., 400K to 500K in cellular telephone applications). Synchronous turn-on of high-side switches 506 with the system clock further facilitates noise filtering. In addition, the combination of control module 520 with a variable number of enabled high-side switches 506 and low-side switches 510 provides a combination of low switching loss at light load, fast response to transient load and adaptive current limit for low output ripple at light load.

Although particular embodiments of the present invention have been shown and described, it will be apparent to those skilled in the art that changes and modifications may be made without departing from the present invention in its broader aspects, and therefore, the appended claims are to encompass within their scope all such changes and modifications that fall within the true scope of the present invention.

What is claimed is:

1. A method for control of a switching regulator, the switching regulator including a parallel series of high side switches and a parallel series of low side switches with the high and low side switches connected to a common inductor, the method comprising:
   a) closing m of the high side switches;
   b) opening all of the high side switches;
   c) closing m of the low side switches;
   d) opening all of the low side switches; and
   e) repeating steps a through d while varying the number m in proportion to the load applied to the switching regulator.

2. A method as recited in claim 1 in which the high side switches are opened when the rate of current flowing from the high side switches to the inductor exceeds a predetermined maximum.

3. A method as recited in claim 1 in which the high side switches are opened when the output of the regulator exceeds a first predetermined voltage.

4. A method as recited in claim 1 in which the low side switches are opened when the output of the switching regulator falls below a second predetermined voltage.

5. A method as recited in claim 1 in which the low side switches are opened to prevent current flowing from the inductor to the low side switches.

6. A method as recited in claim 1 where the steps of closing and opening the high side switches is controlled to avoid a predetermined switching frequency.

7. A switching regulator that comprises:
   an inductor;
   a parallel series of high side switches;
   a parallel series of low side switches with the high and low side switches connected to the inductor;
   a feedback circuit configured to monitor the load applied to the switching regulator;
   a controller configured to:
      a) close m of the high side switches;
      b) open all of the high side switches;
      c) close m of the low side switches;
      d) open all of the low side switches; and
      e) repeat the steps a through d while varying the number m in proportion to the load applied to the switching regulator.

8. A switching regulator as recited in claim 7 that further comprises a circuit for monitoring the current flowing through at least one of the high side switches and in which the controller is configured to open the high side switches when the rate of current flowing from the high side switches to the inductor exceeds a predetermined maximum.

9. A switching regulator as recited in claim 7 that further comprises a circuit for monitoring the voltage at the output of the switching regulator and in which the controller is configured to open the high side switches when the output of the regulator exceeds a first predetermined voltage.

10. A switching regulator as recited in claim 7 that further comprises a circuit for monitoring the voltage at the output of the switching regulator and in which the controller is configured to open the low side switches when the output of the switching regulator falls below a second predetermined voltage.

11. A switching regulator as recited in claim 7 that further comprises a circuit for monitoring the current flowing through at least one of the low side switches and in which the controller is configured to open the low side switches to prevent current flowing from the inductor to the low side switches.

12. A switching regulator as recited in claim 1 in which the controller is configured to control the opening and closing of the high side switches to avoid a predetermined switching frequency.

* * * * *